Feb. 1, 1949.   R. M. HEINTZ   2,460,502
GENERATOR MOUNTING FLANGE
Filed July 18, 1946

INVENTOR.
RALPH M. HEINTZ
BY
ATTORNEY

Patented Feb. 1, 1949

2,460,502

UNITED STATES PATENT OFFICE 2,460,502

GENERATOR MOUNTING FLANGE

Ralph M. Heintz, Cleveland, Ohio, assignor to Jack & Heintz Precision Industries, Inc., Cleveland, Ohio, a corporation of Delaware Application July 18, 1946, Serial No. 684,629

3 Claims. (Cl. 171—252)

This invention relates to improvements in generator construction of the type disclosed in the United States patent to Ralph M. Heintz for Torsional vibration damper, No. 2,346,432, April 11, 1944.

One of the primary objects of the invention is to provide a mounting base for the generator, or like device, which eliminates the structural weaknesses and undesirable vibrations inherent in the conventional mountings.

Another object is to provide a mounting base which is integral with the generator shell and circumferentially supported at its outer diameter so as to insure strength and rigidity such that the natural resonance of the generator is above that encountered in any practical application of the generator.

A further object is to provide a generator shell which also, by means of properly arranged apertures, provides not only for adequate air exhaust for cooling purposes, but also provides for inspection and accessibility to the mounting bolts for connection to the engine, or other prime mover, to which it is attachable for use.

With the foregoing and other objects in view, the invention resides in the following specification and appended claims, certain embodiments and details of construction being shown in the accompanying drawings in which:

Figure 1:
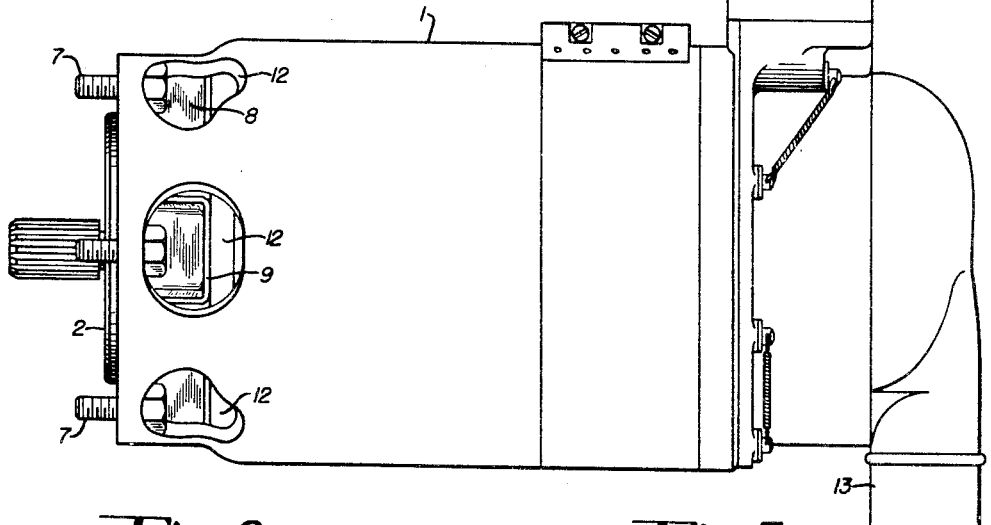
Figure 1 is a view in side elevation of the generator.
Figures 2, 3:
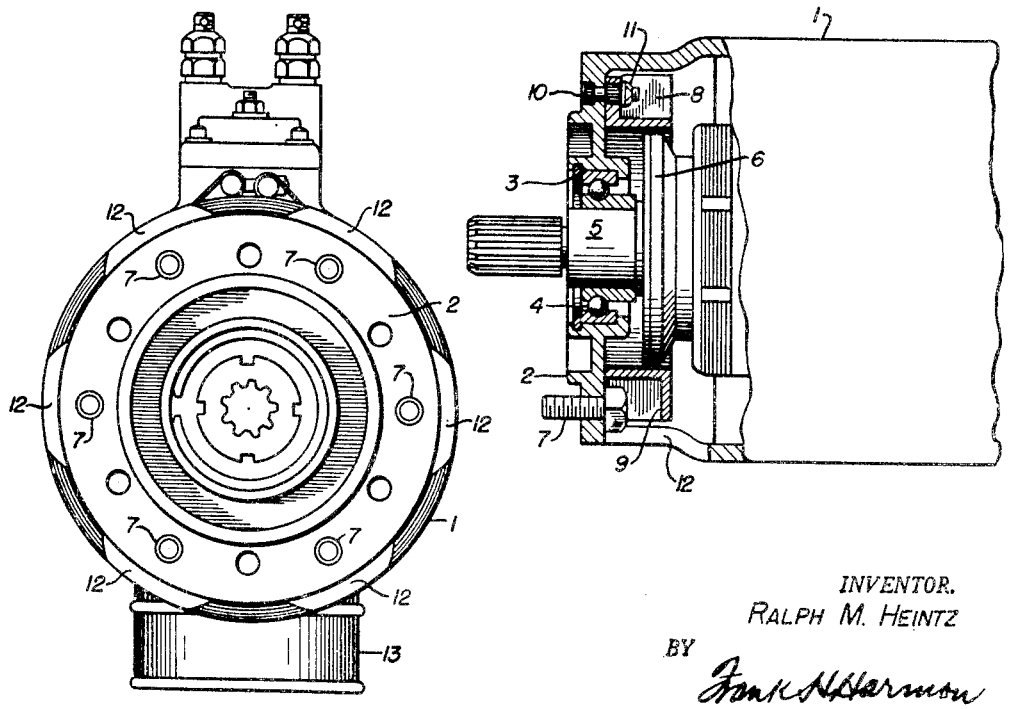
Figure 2 is an end view of the generator showing the mounting base.
Figure 3 is a view in side elevation of the generator with the shell partly broken away and showing the mounting base and bearing assembly in longitudinal section.

Referring more particularly to the drawings, the generator shell 1 is extended in one integral piece to include an inwardly extending circular flange 2 constituting the mounting base for removably securing the generator to an engine, or other prime mover. Integral with flange 2 is a hollow barrel portion undercut to receive a snap ring 3, which supports a ball bearing assembly 4 for supporting the drive end of the generator main drive shaft 5. The element generally indicated at 6 is a friction clutch type of torsional vibration damper disclosed in the above identified Heintz patent.

The mounting base, as shown, is provided with six equally spaced holes to receive six mounting bolts 7 whose threaded portions extend outwardly and whose heads are inside of the shell. In order to insure against the bolts dropping into the operating mechanism of the generator, a captive plate 8 with a retainer flange 9 is secured to the inside of the mounting base by six equally spaced bolts 10, and captive nuts 11. The generator shell is also provided with six equally spaced openings, or windows, 12 in its wall near the drive end. The purpose of these windows is two-fold. They provide exhaust outlets for the cooling air drawn in from the air intake 13. The windows also function as inspection windows as well as making the heads of the mounting bolts 7 accessible for manual application of a wrench to secure and tighten the mounting base and generator to the engine frame.

By means described in the above Heintz patent torsional vibration is greatly lessened by the use of a flexible drive shaft and a friction clutch plate type of torsional vibration damper.

The present mounting base 2 eliminates the conventional separate mounting flange and its inherent vibration weaknesses. Preferably of heat treated steel and integral with the generator shell, this mounting base is circumferentially supported at its outer diameter thus providing such a strength and stiffness that the natural resonance of the generator is above all existing frequencies encountered in any practical application of use of the generator.

I claim:

1. In a machine adapted to be releasably mounted on and driven from a pulsating power source, a housing shell and a drive shaft housed therein, said shell having at it one end an integral radially inwardly extending centrally apertured flange for supporting the bearings for said drive shaft and constituting the mounting base for releasably securing the machine to said power source, said flange being apertured to receive mounting bolts extending outwardly from said shell, said shell having windows to permit access to the interior of said shell for insertion and tightening of said bolts.

2. In a machine adapted to be releasably mounted on and driven from a pulsating power source, a housing shell and a drive shaft housed therein, said shell having at its one end an integral radially inwardly extending centrally apertured flange for supporting the bearings for said drive shaft and constituting the mounting base for releasably securing the machine to said power source, said flange being apertured to receive mounting bolts extending outwardly from said shell, said shell having windows to permit access to the interior of said shell for insertion and tightening of said bolts as well as forming discharge outlets for cooling air passing over the interior of said shell, a captive plate removably secured to the inside of said flange for retaining said fastening bolts.

3. In a machine adapted to be releasably mounted on and driven from a pulsating power source, a housing shell and a drive shaft housed therein, said shell having at its one end an integral radially inwardly extending centrally apertured flange for supporting the bearings for said drive shaft and constituting the mounting base for releasably securing the machine to said power source, said flange being apertured to receive mounting bolts, a captive plate removably secured to the inside of said flange for retaining said fastening bolts.

RALPH M. HEINTZ.

REFERENCES CITED

The following references are of record in the file of this patent:

UNITED STATES PATENTS

| Number | Name | Date |
| --- | --- | --- |
| 2,360,303 | Ingalls | Oct. 10, 1944 |
| 2,368,537 | Gilbert | Jan. 30, 1945 |